(12) United States Patent
Nishide

(10) Patent No.: US 8,325,895 B2
(45) Date of Patent: Dec. 4, 2012

(54) CONFERENCE SYSTEM AND CONFERENCE TELEPHONE LINE SETTING METHOD

(75) Inventor: Nobuo Nishide, Kawasaki (JP)

(73) Assignee: NEC Infrontia Corporation, Kawasaki-Shi (JP)

( * ) Notice: Subject to any disclaimer, the term of this patent is extended or adjusted under 35 U.S.C. 154(b) by 1015 days.

(21) Appl. No.: 12/056,867

(22) Filed: Mar. 27, 2008

(65) Prior Publication Data

US 2008/0240391 A1    Oct. 2, 2008

(30) Foreign Application Priority Data

Mar. 30, 2007   (JP) ................. 2007-094939

(51) Int. Cl.
*H04M 3/42* (2006.01)
*H04L 12/16* (2006.01)
*H04Q 11/00* (2006.01)

(52) U.S. Cl. .............. 379/202.01; 379/203.01; 370/260; 370/261; 370/262

(58) Field of Classification Search ............. 379/202.01, 379/203.01; 370/260, 261, 262
See application file for complete search history.

(56) References Cited

U.S. PATENT DOCUMENTS

| 6,665,392 B1* | 12/2003 | Wellner et al. ............... 370/261 |
| 7,426,193 B2* | 9/2008 | Roher et al. ................. 370/261 |
| 7,889,851 B2* | 2/2011 | Shah et al. ............... 379/202.01 |
| 7,894,805 B2* | 2/2011 | Joglekar ................. 379/202.01 |
| 2002/0091769 A1* | 7/2002 | Drozdzewicz et al. ....... 709/204 |
| 2003/0158900 A1* | 8/2003 | Santos ......................... 709/205 |
| 2007/0280464 A1* | 12/2007 | Hughes et al. ........... 379/205.01 |
| 2007/0286388 A1* | 12/2007 | Vaught et al. ........... 379/202.01 |

FOREIGN PATENT DOCUMENTS

| JP | 10243110 A | 9/1998 |
| JP | 2003234938 A | 6/2003 |
| JP | 2003274023 A | 9/2003 |
| JP | 2003324705 | 11/2003 |
| JP | 2005222246 A | 6/2005 |
| JP | 2006236178 | 9/2006 |

OTHER PUBLICATIONS

Communication dated Nov. 9, 2011 issued by the Japanese Patent Office in counterpart Japanese Patent Application No. 2007-094939.

* cited by examiner

*Primary Examiner* — Ahmad Matar
*Assistant Examiner* — Nafiz E Hoque
(74) *Attorney, Agent, or Firm* — Sughrue Mion, PLLC

(57) ABSTRACT

Client terminals of participants of a conference, connected to a network, and a server connected to the client terminals are used to authenticate and confirm the participants of the conference. After successful authentication, a telephone line is set among telephone sets of the participants to hold the conference.

20 Claims, 5 Drawing Sheets

---

970

| SUBJECT | CONFERENCE NOTIFICATION |
|---|---|
| From | CONFERENCE SERVER |
| To | PARTICIPANT, MR./MS. A |
| TEXT | CONFERENCE NOTIFICATION<br>PRODUCT DEVELOPMENT TELEPHONE CONFERENCE WILL BE HELD AT HH:MM ON MM DD<br><br>ORGANIZER: MR./MS. A<br><br>PARTICIPANTS:<br>  MR./MS. A OF ○○ DIVISION<br>  MR./MS. B OF □□ DIVISION<br>  MR./MS. C OF △△ DIVISION<br><br>PLEASE CLICK ON URL DISPLAYED BELOW AT TIME SPECIFIED ABOVE. CONFERENCE SYSTEM WILL MAKE CALL TO NUMBER DISPLAYED BELOW. WHEN YOUR TELEPHONE RINGS, PLEASE LIFT RECEIVER TO PARTICIPATE IN CONFERENCE                 972<br>ALL DESTINATION TELEPHONE NUMBER CAN BE CHANGED.<br>WHEN TELEPHONE NUMBER DISPLAYED BELOW IS DIFFERENT FROM DESIRED TELEPHONE NUMBER, CLICK ON TELEPHONE NUMBER DISPLAYED BELOW AND INPUT DESIRED CALL DESTINATION TELEPHONE NUMBER.<br><br>CALL DESTINATION TELEPHONE NUMBER :   403   ~971<br><br>PLEASE CLICK ON URL<br>http://kaigisystem/kaigi1/503<br><br>IF YOU HAVE ANY QUESTION REGARDING THIS NOTIFICATION, PLEASE CONTACT ORGANIZER A<br>EXTENSION NUMBER 401 OR aaaa@kaisya.co.jp |

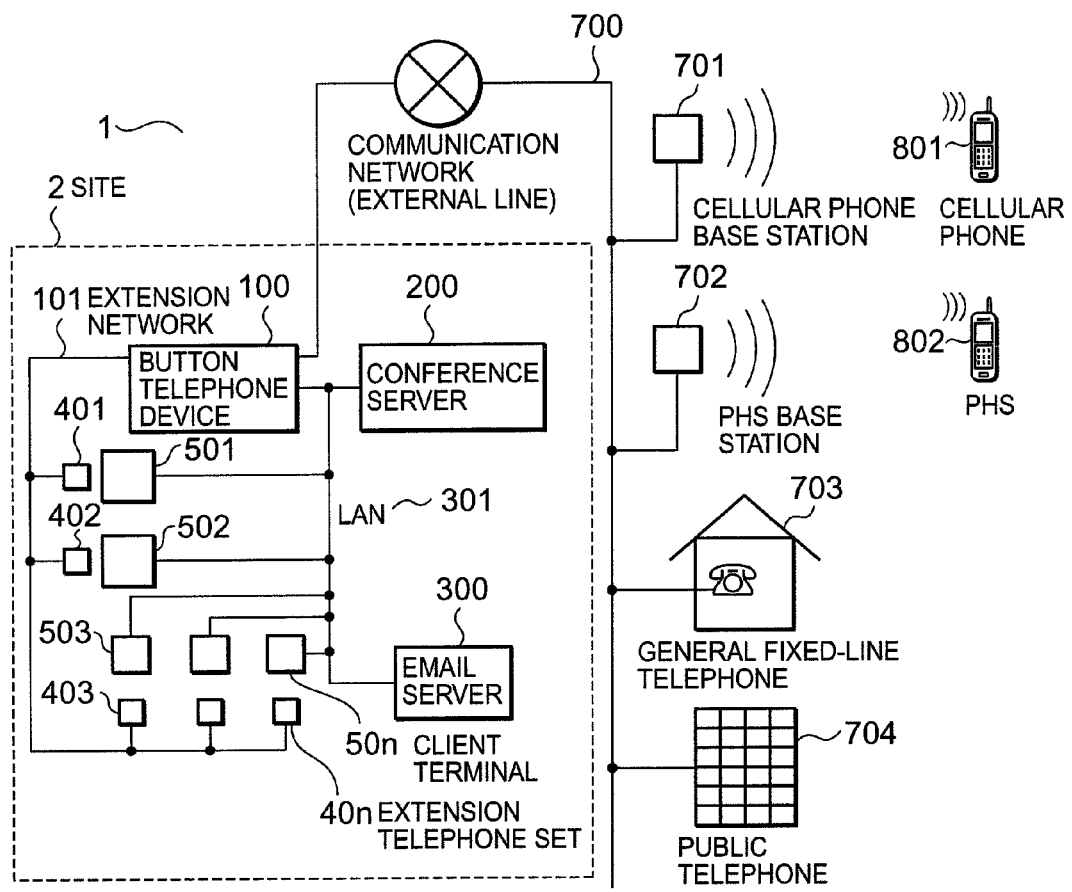

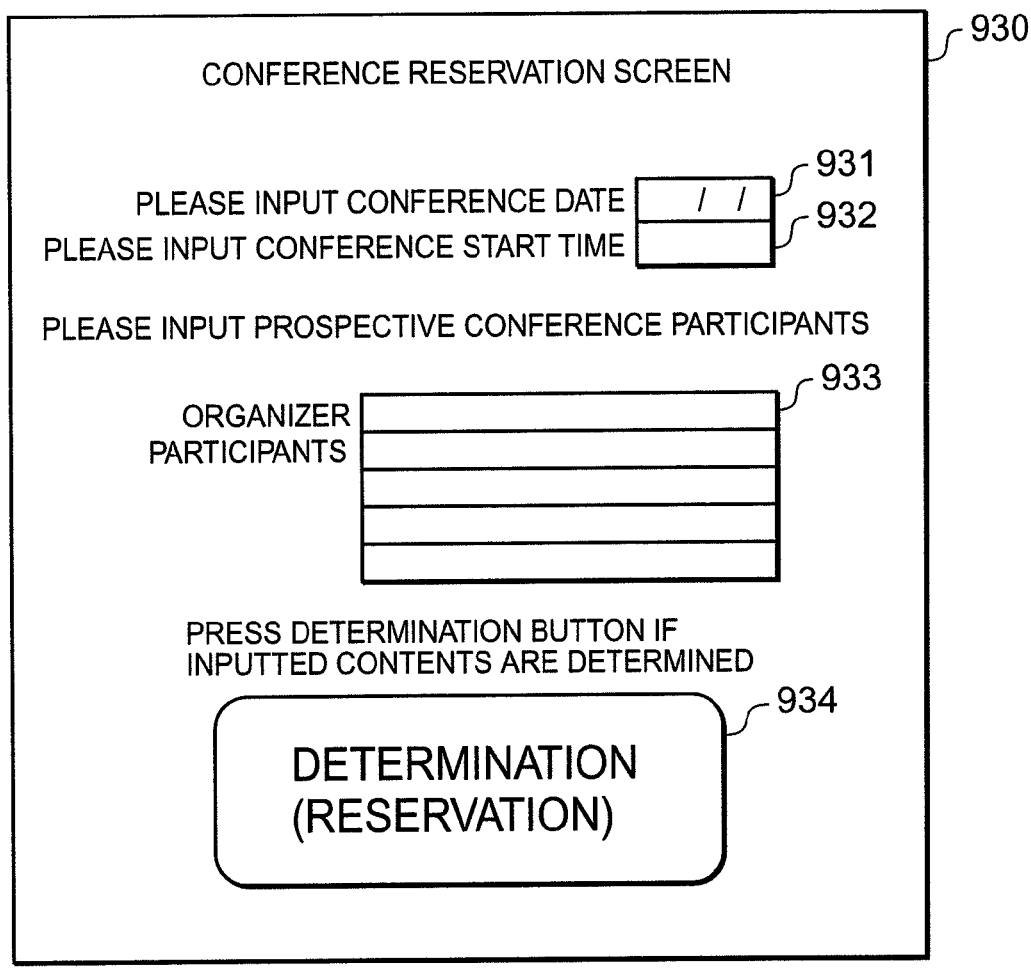

FIG. 5

| SUBJECT | CONFERENCE NOTIFICATION |
|---|---|
| From | CONFERENCE SERVER |
| To | PARTICIPANT, MR./MS. C |
| TEXT | CONFERENCE NOTIFICATION<br>PRODUCT DEVELOPMENT TELEPHONE CONFERENCE WILL BE HELD<br>AT HH:MM ON MM DD ~ 951     952<br><br>ORGANIZER: MR./MS. A ~ 953<br>PARTICIPANTS: ─ 954<br>  MR./MS. A OF ○○DIVISION<br>  MR./MS. B OF □□DIVISION<br>  MR./MS. C OF △△DIVISION     955<br><br>PLEASE CLICK ON URL DISPLAYED BELOW AT TIME SPECIFIED ABOVE. CONFERENCE SYSTEM WILL MAKE CALL TO NUMBER DISPLAYED BELOW. WHEN YOUR TELEPHONE RINGS, PLEASE LIFT RECEIVER TO PARTICIPATE IN CONFERENCE<br><br>PLEASE CLICK ON URL ─ 956<br>  http://kaigisystem/kaigi1/503     957<br><br>IF YOU HAVE ANY QUESTION REGARDING THIS NOTIFICATION, PLEASE CONTACT ORGANIZER A<br>EXTENSION NUMBER 401 OR aaaa@kaisya.co.jp |

CTI COMMAND          961          962          960

| CALL SOURCE NUMBER | CALL DESTINATION NUMBER |
|---|---|
| 403 | 600 |

FIG. 7

| SUBJECT | CONFERENCE NOTIFICATION |
|---------|-------------------------|
| From | CONFERENCE SERVER |
| To | PARTICIPANT, MR./MS. A |
| TEXT | CONFERENCE NOTIFICATION<br>PRODUCT DEVELOPMENT TELEPHONE CONFERENCE WILL BE HELD AT HH:MM ON MM DD<br><br>ORGANIZER: MR./MS. A<br><br>PARTICIPANTS:<br>  MR./MS. A OF ○○ DIVISION<br>  MR./MS. B OF □□ DIVISION<br>  MR./MS. C OF △△ DIVISION<br><br>PLEASE CLICK ON URL DISPLAYED BELOW AT TIME SPECIFIED ABOVE. CONFERENCE SYSTEM WILL MAKE CALL TO NUMBER DISPLAYED BELOW. WHEN YOUR TELEPHONE RINGS, PLEASE LIFT RECEIVER TO PARTICIPATE IN CONFERENCE<br><br>ALL DESTINATION TELEPHONE NUMBER CAN BE CHANGED. WHEN TELEPHONE NUMBER DISPLAYED BELOW IS DIFFERENT FROM DESIRED TELEPHONE NUMBER, CLICK ON TELEPHONE NUMBER DISPLAYED BELOW AND INPUT DESIRED CALL DESTINATION TELEPHONE NUMBER.<br><br>CALL DESTINATION TELEPHONE NUMBER : [ 403 ]<br><br>PLEASE CLICK ON URL<br>[ http://kaigisystem/kaigi1/503 ]<br><br>IF YOU HAVE ANY QUESTION REGARDING THIS NOTIFICATION, PLEASE CONTACT ORGANIZER A<br>    EXTENSION NUMBER 401 OR aaaa@kaisya.co.jp |

FIG. 8

MEMORY TABLE 940

| USER NAME | DIVISION NAME | EMAIL ADDRESS | IP ADDRESS | TELEPHONE NUMBER 945 |
|---|---|---|---|---|
| USER A | ○○DIVISION | aaaa@kaisya.co.jp | 192.168.XXX.XX1 | 401 |
| USER B | □□DIVISION | bbbb@kaisya.co.jp | 192.168.XXX.XX2 | 402 |
| USER C | △△DIVISION | cccc@kaisya.co.jp | 192.168.XXX.XX3 | 090XX○○□□△△ |

FIG. 9

MEMORY TABLE 990

| USER NAME | DIVISION NAME | EMAIL ADDRESS | IP ADDRESS | CALLING TIME 991 | TELEPHONE NUMBER 945 |
|---|---|---|---|---|---|
| USER A | ○○DIVISION | aaaa@kaisya.co.jp | 192.168.XXX.XX1 | NULL | 401 |
| USER B | □□DIVISION | bbbb@kaisya.co.jp | 192.168.XXX.XX2 | MM DD HH:MM | 090XX○△△○□□ |
| USER C | △△DIVISION | cccc@kaisya.co.jp | 192.168.XXX.XX3 | NULL | 403 |

CONFERENCE SYSTEM AND CONFERENCE TELEPHONE LINE SETTING METHOD

This application is based upon and claims the benefit of priority from Japanese patent application No. 2007-094939, filed on Mar. 30, 2007, the disclosure of which is incorporated herein in its entirety by reference.

BACKGROUND OF THE INVENTION

1. Field of the Invention

The present invention relates to a conference system for holding a conference on a network by using a button telephone device and a conference server having a computer telephony integration (CTI) system, and to a conference telephone line setting method therefor.

2. Description of the Related Art

In known conventional conference systems, a conference is held on a network by establishing one-to-many communication or many-to-many communication through communication lines such as telephone lines, dedicated lines, and the Internet. Applied technologies thereof have been increasingly developed. For example, Japanese Unexamined Patent Application Publication (JP-A) No. 2003-324705 discloses a video conference system using a client-server system in which a relay server and a plurality of communication terminals are connected via a communication network. Further, Japanese Unexamined Patent Application Publication (JP-A) No. 2006-236178 discloses a video conference system using a client-server system in which a management server and clients are connected via a network.

Specifically, in the system disclosed in Japanese Unexamined Patent Application Publication (JP-A) No. 2003-324705, when the relay server and the plurality of communication terminals perform communication, a conference can be held among the communication terminals. In addition, Japanese Unexamined Patent Application Publication (JP-A) No. 2003-324705 describes a function in which, when an organizer reserves a conference in the relay server, prospective participants' intentions to participate in the conference can be confirmed, which is convenient for users. Further, in the system, email notifying date and time at which the conference is held is sent to the prospective participants of the conference.

In the system disclosed in Japanese Unexamined Patent Application Publication (JP-A) No. 2006-236178, the management server mediates between the clients. In a technical aspect, the management server sends connection destination location information to each of the clients and connection is made between the clients in the disclosed system.

However, in the video conference system disclosed in Japanese Unexamined Patent Application Publication (JP-A) No. 2003-324705, in which, when an organizer reserves a conference in the relay server, prospective participants' intentions to participate in the conference can be confirmed, special software needs to be operated all the time in the communication terminals of the users. Unless conferences are frequently held, since the special software occupies useful systems of computers serving as the communication terminals, it is not effective. Further, Japanese Unexamined Patent Application Publication (JP-A) No. 2003-324705 describes that email sent from the relay server includes, in addition to the conference date and time, an IP address and an authentication ID which are necessary to access the relay server. In this case, each user needs to be authenticated manually after accessing the relay server.

In the video conference system disclosed in Japanese Unexamined Patent Application Publication (JP-A) No. 2006-236178, a dynamic host configuration protocol (DHOP) function is used to assign IP addresses to the clients and connection destination address information is obtained, so the video conference system can be used in a WAN or a LAN. However, the video conference system cannot function in the world wide web (WWW). Further, to use the video conference system, the user needs to manually input a user ID from the client to the management server.

SUMMARY OF THE INVENTION

In view of the above-mentioned problems, the present invention has been made, and an object of the present invention is to provide a conference system in which a link to access a conference is included in email that notifies the conference to be held, and, when the link is selected, it is possible to automatically participate in the telephone conference.

Another object of the present invention is to provide a conference system in which a link to access a conference is included in email that notifies the conference to be held, and authentication is performed just by selecting the link to participate in the telephone conference.

Still another object of the present invention is to provide a conference system in which a prospective call destination telephone number is included in email that notifies a conference to be held and the prospective call destination telephone number can be changed, so the conference participant can use a desired telephone set to participate in the telephone conference.

Still another object of the present invention is to provide a conference system in which a link to access a conference is included in email that notifies the conference to be held such that the link can be selected prior to the conference, so calling from the conference system can be reserved.

According to an aspect of the present invention, there is provided a conference system used to hold a conference on a communication network, comprising:

client terminals of participants of the conference, connected to the communication network;

telephone sets of the participants, connected to a telephone line;

a telephone line device connected to the telephone sets through the telephone line; and a server connected to the communication network and capable of operating the telephone line device, wherein;

the server has a function of authenticating the client terminals of the participants of the conference; and the telephone line device has a function of setting a telephone line for the conference among the telephone sets of the participants.

According to another aspect of the present invention, there is provided a conference server which is used in a conference system for holding a conference on a communication network, and is connected to client terminals of participants of the conference through the communication network and to a telephone line device that is connected to telephone sets of the participants through a telephone line, comprising:

a function of authenticating the client terminals of the participants of the conference; and a function of causing the telephone line device to set a telephone line for the conference among the telephone sets of the participants.

According to the other aspect of the present invention, there is provided a conference telephone line setting method used to hold a conference on a network, comprising the steps of:

authenticating client terminals of participants of the conference by using a server connected to the client terminals via the network; and connecting, after the client terminals are successfully authenticated, telephone sets of the participants of the conference via a telephone line by using a telephone line device to hold the conference among the participants.

According to the present invention, a conference system can be provided in which a link to access a conference is included in email that notifies the conference to be held, and, when the link is selected, it is possible to automatically participate in the telephone conference.

BRIEF DESCRIPTION OF THE DRAWINGS

FIG. 1 is a schematic diagram showing a telephone conference system according to a first embodiment of the present invention;

FIG. 2 is a diagram showing example user information of the first embodiment;

FIG. 3 is a schematic diagram showing a conference reservation screen of the first embodiment;

FIG. 4 shows a memory table held by a conference server of the first embodiment;

FIG. 5 shows an example of conference notification email sent to a user, in the first embodiment;

FIG. 6 shows an example of transmission data of a CIT command, in the first embodiment;

FIG. 7 shows an example of conference notification email sent to a user, in a second embodiment;

FIG. 8 shows a memory table held by a conference server of the second embodiment; and FIG. 9 shows a memory table held by a conference server of a third embodiment.

DETAILED DESCRIPTION OF THE PREFERRED EMBODIMENTS

A first embodiment of the present invention will be described with reference to FIGS. 1 to 5.

FIG. 1 is a schematic diagram showing a telephone conference system 1 according to the first embodiment. The telephone conference system 1 can be roughly divided into components disposed in a site 2 where a main system is configured and components disposed outside the site 2.

In the site 2, an extension network 101 is configured around a button telephone device 100. A plurality of extension telephone sets (401, 402, . . . , and 40n) are connected to the extension network 101. Each extension telephone set has an extension number associated with a number assigned to the user, such as an employee number, or associated with the number of the division the user belongs to. In this embodiment, one extension telephone set with an extension number is assigned to each user. Each extension telephone set can be used to make an extension call via the button telephone device 100 and to make a three-way call or a simplex call by using a function of the button telephone device 100. The button telephone device 100 is also connected to an external line 700 and connects the extension line to the external line when needed. The external line 700 is connected to telephone sets such as a general fixed-line telephone 703, a public telephone 704, a cellular phone 801, and a PHS phone 802, although a description of the external line 700 will not be given much. Note that it is needless to say that the telephone sets used for radio communications use wireless base stations. In the present invention, the external line is defined to be a conventional telephone infrastructure, and is a line network expressed as a public telephone network which includes an IP telephony network, a general fixed line, a general fixed-line network, or a public telephone switching network.

In the site 2, in addition to the extension network 101, a LAN 301 is configured for information processors. The LAN 301 connects a conference server 200, an email server 300, a plurality of client terminals (501, 502, . . . , 50n), and the button telephone device 100 such that they can communicate with each other. Note that, in FIG. 1, the conference server 200, the email server 300, the client terminals (501, 502, . . . , 50n), and the button telephone device 100 are connected by wire, but a part of or all of them may be connected in a wireless network as long as data communication is allowed.

The conference server 200 includes a CPU serving as a calculation section and a control section, a RAM serving as a storage section, an arithmetic processing section configured by a ROM which stores a basic control program, and a communication interface allowing communications with other information processors via the LAN 301. The conference server 200 further includes a storage device in which various programs such as a control program (OS) and a CTI program are installed. The storage device also stores various data files such as a memory table. Note that the CTI program is used to operate the button telephone device 100. Specifically, with the CTI program, the arithmetic processing section of the conference server 200 sends a CTI command to the button telephone device 100, based on various conditions, such as access from a client terminal, to control the operation of the button telephone device 100.

The email server 300 is a typical email server and has a function of sending, receiving, transferring, and holding email, or other functions. In this embodiment, the email server 300 is provided for the site 2 and serves as a site email server connected to the LAN 301. Note that, as the email server, an external email server may be used as long as email can be sent and received. For example, an email service provided by a provider may be used, or even a web email service may be used.

Each of the plurality of client terminals (501, 502, . . . , 50n) can receive email. The client terminal has a display device and a link displayed thereon as a content of email can be selected. In this embodiment, the client terminals are assumed to be personal computers. Specifically, each of the client terminals includes a control section, a RAM, a ROM, a storage device, a communication interface, a display device, and an input and output device. In addition to personal computers, the client terminals may be mobile devices such as personal digital assistants (PDAs).

To each of the client terminals, the ID (employee number) assigned to the user, the email address associated with the user name or the like, and the IP address corresponding to the communication interface are allocated. In this embodiment, one client terminal with an email address is assigned to each user. Various types of software such as a client CTI program for conference reservation, email receiving software, and browser software are installed in the client terminal. Note that, in the present invention, a link indicates a character string or an icon which specifies the address (information indicating a server name, a port number, a folder name, or a file name). When the link is selected, access is made to the specified address.

With this configuration, the telephone conference system 1 of this embodiment can realize a conference.

A conference reservation method and a conference participation method will be described as main operations.

First, the conference reservation method will be described. It is assumed that a conference is held at HH:MM on MM DD, YY. An extension number is allocated to a virtual conference room. In this embodiment, the extension number is "600". When calls are made from multiple telephone sets to the extension number "600", many-to-many call is performed.

It is assumed that a user A who is an organizer and users B and C who are asked to attend the conference are participants of the conference. FIG. 2 shows personal information items of the users A, B, and C. The items include the user names, the client terminals, the numbers of the extension telephone sets, the extension numbers, the email addresses, the IP addresses, and the cellular phone numbers. A description will be given with reference to FIG. 2.

The user A, who is the organizer of the conference, uses the client CTI program that is installed in the client terminal 501 to activate a conference reservation screen 930 (see FIG. 3) (Step S101).

According to the form displayed on the conference reservation screen 930, the user A specifies a conference date 931, a starting time 932, and prospective participants 933, and presses a determination button 934 (Step S102).

The client terminal 501 sends the conference reservation information which has been inputted using the conference reservation screen 930 to the conference server 200 via the LAN 301 (Step S103).

The conference server 200 obtains information on the conference date and time and the prospective participants from the conference reservation information, and reserves a virtual conference room (extension number "600") (Step S104).

Another conference reservation method may be used, in which the client terminal 501 uses its browser function to access the conference server 200 via the LAN 301 and performs conference reservation on a web application. Note that the number (extension number) of a conference room to be reserved by the conference server 200 may be set to the smallest number among numbers (extension numbers) of conference rooms available at the conference date and time reserved by the organizer. Alternatively, the number (extension number) of a conference room to be reserved may be set by the organizer.

When the conference is reserved, the conference server 200 sends conference notification email to the email addresses (aaaa@kaisya.co.jp, bbbb@kaisya.co.jp, and cccc@kaisya.co.jp) of the prospective participants (in this example, the users A, B, and C) registered in advance in a memory table 940. The memory table 940 is shown in FIG. 4. The memory table 940 includes information on a user name 941, a division name 942, an email address 943, an IP address 944, and a telephone number 945, which correspond to a user specified by the user name 941 (Step S105).

The conference notification email is received by the client terminals (501, 502, and 503) of the prospective participants via the email server 300. The prospective participants check the sent email (conference notification email) and understand that they are asked to attend the conference (Step S106).

FIG. 5 shows conference notification email 950 sent to the user C. The conference notification email 950 includes at least conference date and time 951 and a connection destination URL 956. In addition, the conference notification email 950 includes, as needed, an organizer name 953, an organizer's comment 952, prospective participants 954, a fixed phrase for the conference system 955, and contact information of the organizer 957 which is registered in the conference server 200.

Next, the conference participation method will be described in a case of the user C, who has been asked to attend the conference. The user C, who is a prospective participant of the conference, confirms that it is time for the conference, and uses the client terminal 503 to browse the conference notification email 950 received from the conference server 200 (Step S201).

Then, the user C selects the URL "http://kaigisystem/kaigi1/503" 956 included in the conference notification email 950 (Step S202).

The client terminal 503 recognizes that the user C has selected the URL 956, and accesses the conference server 200 according to location information specified by the URL 956 (Step S203).

The conference server 200 obtains and recognizes the IP address "192.168.xxx.xx3" of the client terminal 503 that has been used to select the URL 956 to access the conference server 200. Further, the conference server 200 reads the IP address of the client terminal 503, which is stored in advance in the memory table 940 and compares those IP addresses. When the IP addresses are identical as a result of the comparison, the conference server 200 determines that the access made from the client terminal 503 of the user C is valid (Step S204).

At this time, when the URL "http://kaigisystem/kaigi1/503" 956 is selected from a device having a different IP address, such as another client terminal, the conference server 200 determines that the access is invalid because of the different IP address and does not allow the device to access the conference.

After the access from the client terminal 503 is determined to be valid, the conference server 200 executes the CTI program. The CTI program refers to the memory table 940 (see FIG. 4) stored in the storage device of the conference server 200 and obtains the telephone number "403" associated with the user C from the telephone number 945 (Step S205).

The conference server 200 sends the telephone number "403" read in Step S205 and the extension number "600" of the reserved conference room to the button telephone device 100 in the form of a CTI command (Step S206).

According to the CTI command received from the conference server 200, the button telephone device 100 causes the extension telephone set 403 (extension number "403") to make a call to the specified extension number "600" of the conference room (Step S207).

The user C, who is the prospective participant of the conference, confirms that the extension telephone set 403 used by the user C has made a call to the extension number "600" of the conference room and has connected to the extension number "600" of the conference room with the use of an automatic response function of the button telephone device 100. Then, the user C participates in the conference by using the extension telephone set 403 connected to the extension number "600" of the conference room (Step S208).

FIG. 6 shows transmission data of a CTI command 960. The CTI command 960 is used to operate the button telephone device 100, and is defined for each type of a button telephone device. In a basic CTI command 960 used in this embodiment, header information on the call source and header information on the call destination are added to a call source number and a call destination number, respectively. Then, the CTI command 960 is encapsulated and sent to the button telephone device 100 via the LAN 301. The button telephone device 100 reads the received CTI command 960 and makes a call from the call source number to the call destination number according to the received CTI command. The CTI command 960 of FIG. 6 indicates that a call is to be made from the call source number "403" to the call destination number "600".

As described above, according to this embodiment, the conference system can be provided in which the link to access the conference is included in email notifying the conference to be held and, by selecting the link, it is possible to automatically participate in the telephone conference. At the same time, in the conference system, because the link to access the conference is included in email notifying the conference to be held and it is possible to automatically participate in the telephone conference by selecting the link, authentication performed by inputting a user name and a password, or password authentication performed by using a touch-tone telephone set is not required, and personal authentication is simplified.

A second embodiment of the present invention will be described with reference to FIGS. 7 and 8. In this embodiment, identical reference numerals are given to portions identical to those in the first embodiment described with reference to FIGS. 1 to 6, and a description thereof is omitted.

In the telephone conference system 1 of the second embodiment, the same conference reservation method is used as in the first embodiment. A difference between the first and second embodiments is conference notification email to be sent by the conference server 200 when a conference reservation is made. Specifically, the conference notification email further includes a call destination telephone number in the format.

FIG. 7 shows an example of conference notification email 970 to be sent to the user C. The conference notification email 970 includes a call destination telephone number 971, which is not included in the conference notification email 950 shown in FIG. 5. The call destination telephone number 971 is obtained from the telephone number 945 of the memory table 940 (see FIG. 4) stored in the conference server 200, and is included in the conference notification email 970. The call destination telephone number 971 included in the conference notification email 970 is displayed as a selectable link and, when the link is selected, a change screen (not shown) for changing the memory table 940 of the conference server 200 is displayed. When a desired call destination telephone number is inputted to the displayed change screen, the telephone number 945 of the memory table 940 is changed. Further, the change screen can also be used to change the email address 943 and the IP address 944, at the same time of changing the telephone number. When the memory table 940 is changed and fixed, the conference server 200 sends again the conference notification email 970 to the email address of the user who has made the change.

This function is effective when a wrong telephone number registered in the memory table 940 is corrected, when a conference participant is changed, and when another extension telephone set is used to participate in the conference. If a mobile environment capable of selecting the link included in the conference notification email 970 can be used, it is possible to participate in the telephone conference from any location outside the site 2 by inputting the telephone number and the IP address of a cellular phone. FIG. 8 shows the memory table 940 obtained after the user C changes the telephone number 945. The value included in the telephone number 945 corresponding to the user C is changed from the extension number "403", which was originally registered, to a cellular phone number "090xxoo ΔΔ".

When the URL "http://kaigisystem/kaigi1/503" included in the conference notification email 970 is selected by using the client terminal 503 in this state, the client terminal 503 accesses the conference server 200 via the LAN 301 and the conference server 200 executes the CTI program.

The CTI program refers to the memory table 940, reads the cellular phone number "090xxoo ΔΔ" associated with the URL, and sends the read cellular phone number and the extension number "600" of the conference room to the button telephone device 100 in the form of a CTI command. Note that the CTI program generates, for a telephone set, such as a cellular phone, which cannot be directly controlled by the button telephone device 100, a CTI command to make a call from the button telephone device 100 and sends the CTI command to such a telephone set.

The button telephone device 100 makes a call from the extension number "600" of the conference room to the specified cellular phone number "090xxoo ΔΔ". When the user C answers the call made from the extension number "600" of the conference room to the cellular phone number "090xxoo ΔΔ", the user C can participate in the telephone conference.

As described above, according to the second embodiment, the conference system can be provided in which the call destination telephone number is included in the conference notification email and the call destination telephone number can be changed. Therefore, the conference participant can participate in the telephone conference by using a desired telephone set.

A third embodiment of the present invention will be described with reference to FIG. 9. In this embodiment, identical reference numerals are given to portions identical to those in the first and second embodiments described with reference to FIGS. 1 to 8, and a description thereof is omitted.

In a telephone conference system of the third embodiment, the same conference reservation method and the same conference participation method are used as in the second embodiment. Different points are that a calling reservation function is added to the CTI program installed in the conference server 200 and that the memory table further includes information on calling time.

FIG. 9 shows a memory table 990 used in the third embodiment. The memory table 990 of FIG. 9 is obtained by adding calling time 991 to the memory table 940 of FIG. 4.

The calling reservation function is used to confirm whether time has been specified in the calling time 991 of the memory table 990 referred to by the CTI program. When time has been specified in the calling time 991, a call is made to a number specified in the telephone number 945 at the specified time.

In an example of FIG. 9, because "NULL" is specified in the calling time 991 corresponding to the user A and the user C, the button telephone device 100 does not perform anything for the users A and C. On the other hand, "MM DD, HH:MM" is specified in the calling time 991 corresponding to the user B. When it is time specified by "MM DD, HH:MM", the button telephone device 100 makes a call to a cellular phone number "090xxoΔΔo" specified in the telephone number 945 corresponding to the user B.

The memory table 990 can be changed in various ways. For example, when the URL 956 included in the conference notification email 950 (see FIG. 5) is selected prior to the conference start time, a change screen (not shown) for changing the memory table 990 is displayed. The displayed change screen has a calling reservation setting field. When the user inputs a desired calling time in the calling reservation setting field, the calling time 991 of the memory table 990 is changed.

The CTI program of the conference server 200 automatically starts operating at the calling time to refer to the memory table 990 and read the cellular phone number "090xxoΔΔo". Then, the CTI program generates a CTI command in which the read cellular phone number is specified as the call destination and the extension number "600" of the conference room is specified as the call source, and sends the CTI command to the button telephone device 100. The button telephone device 100 makes a call from the extension number "600" of the conference room to the specified cellular phone number "090xxo∆∆o". The user B answers the call made from the extension number "600" of the conference room to the cellular phone number "090xxo∆∆o" to participate in the telephone conference.

According to the present invention, there is provided a conference system in which a server uses computer telephony integration (CTI) to hold a conference on a network. The conference system includes: client terminals connected to the network used by users of the conference system; telephone sets connected to telephone lines used by the users of the conference system; a telephone line device connected to the telephone sets via the telephone line; and a server which is connected to the network, which has a CTI system, and which is capable of operating the telephone line device. When one of the users registers the date and time at which a conference is held and prospective participants of the conference in the server from one of the client terminals via the network, the server notifies the registered date and time and a link to access the conference to be held, which has been automatically generated by the server, to the registered prospective participants via the network. When the prospective participants select the link from the client terminals, the server operates the telephone line device with use of the CTI system so that the telephone line device connects the telephone sets used by the prospective participants who have selected the link, to the conference indicated by the link.

As described above, the conference system can be provided in which the link to access the conference is included in email notifying the conference to be held such that the link can be selected prior to the conference, and therefore, calling from the conference system can be reserved.

Although the present invention has been described in conjunction with a preferred embodiment thereof, the present invention is not limited to the embodiment described above. Various modifications and changes can be applied to the present invention without departing from the scope of the present invention. It goes without saying that such modifications and changes are to be included in the present invention.

For example, although a link to access the conference is displayed in a URL format in the above-mentioned embodiments, the link can also be displayed in another format. For example, the link to access the conference may be displayed as a button that has address information in HTML, or the link may be an IP address directly specified. Although the button telephone device is used to configure the conference system, a private branch exchange (PBX) may also be used to configure the same conference system. Further, extension telephone sets and cellular phones are used in the embodiments, and PHS phones may also be used. Further, general fixed-line telephones or public telephones may also be used. In other words, there is not a limit on the type of a used telephone as long as the telephone provides a conventional telephone infrastructure in which line connection is established with telephone numbers.

What is claimed is:

1. A conference system used to hold a conference on a communication network, comprising:
    client terminals of participants of the conference, connected to the communication network;
    telephone sets of the participants, connected to a telephone line;
    a telephone line device connected to the telephone sets through the telephone line; and
    a server connected to the communication network and capable of operating the telephone line device,
    wherein;
    the server has a function of authenticating the client terminals of the participants of the conference; and
    the telephone line device has a function of setting a telephone line for the conference among the telephone sets of the participants,
    wherein;
    the server sends a conference notification email to the client terminals when a conference reservation is made,
    the conference notification email includes a call destination telephone number of the participant, and
    the call destination telephone number is changeable,
    wherein the server has a memory table,
    the memory table includes at least telephone numbers of the participants,
    the call destination telephone number is obtained from the telephone numbers of the memory table and is included in the conference notification email,
    the call destination telephone number included in the conference notification email is displayed as a link which is selectable,
    when the link is selected, a change screen for changing the memory table of the server is displayed, and
    when a desired call destination telephone number is inputted to the displayed change screen, the telephone number of the memory table is changed.

2. A conference system according to claim 1, wherein the function of authenticating the client terminals of the participants of the conference of the server authenticates the client terminals when the client terminals receive email sent from the server and the participants log in an email server.

3. A conference system according to claim 1, wherein the function of authenticating the client terminals of the participants of the conference of the server authenticates the client terminals when a link generated for each of prospective participants is included in email sent from the server and the link is selected.

4. A conference system according to claim 3, wherein the link included in the email is described in a uniform resource locator (URL) format.

5. A conference system according to claim 3, wherein the server recognizes an IP (Internet Protocol) address of each client terminal that has selected the link, and compares the IP address with an IP address stored in advance in association with the client terminal to which the link has been sent, to perform authentication.

6. A conference system according to claim 3, wherein the email sent from the server includes a telephone number of each of the participants together with the link.

7. A conference system according to claim 3, wherein, when the link is selected prior to date and time at which the conference is held, date and time at which a registered telephone set is called are specified.

8. A conference system according to claim 1, wherein the telephone sets are at least one of cellular phones, PHS (Personal Handyphone System) phones, extension telephone sets, and general fixed-line telephone sets.

9. A conference system according to claim 1, wherein the telephone line device is at least one of a button telephone device and a private branch exchange (PBX).

10. A conference server which is used in a conference system for holding a conference on a communication network, and is connected to client terminals of participants of the conference through the communication network and to a telephone line device that is connected to telephone sets of the participants through a telephone line, comprising:

a function of authenticating the client terminals of the participants of the conference; and a function of causing the telephone line device to set a telephone line for the conference among the telephone sets of the participants, wherein;

the conference server sends a conference notification email to the client terminals when a conference reservation is made, the conference notification email includes a call destination telephone number of the participant, and the call destination telephone number is changeable, wherein the server has a memory table, the memory table includes at least telephone numbers of the participants, the call destination telephone number is obtained from the telephone numbers of the memory table and is included in the conference notification email, the call destination telephone number included in the conference notification email is displayed as a link which is selectable, when the link is selected, a change screen for changing the memory table of the server is displayed, and when a desired call destination telephone number is inputted to the displayed change screen, the telephone number of the memory table is changed.

11. A conference server according to claim 10, wherein the function of authenticating the client terminals of the participants of the conference authenticates the client terminals when the client terminals receive sent email.

12. A conference server according to claim 10, wherein the function of authenticating the client terminals of the participants of the conference authenticates the client terminals when a link generated for each of prospective participants is included in sent email and the link is selected.

13. A conference server according to claim 12, wherein the conference server recognizes an IP address of each client terminal that has selected the link, and compares the IP address with an IP address stored in advance in association with the client terminal to which the link has been sent, to perform authentication.

14. A conference telephone line setting method used to hold a conference on a network, comprising the steps of:

authenticating client terminals of participants of the conference by using a server connected to the client terminals via the network; and connecting, after the client terminals are successfully authenticated, telephone sets of the participants of the conference via a telephone line by using a telephone line device to hold the conference among the participants, wherein;

the server sends a conference notification email to the client terminals when a conference reservation is made, the conference notification email includes a call destination telephone number of the participant, and the call destination telephone number is changeable, wherein the server has a memory table, the memory table includes at least telephone numbers of the participants, the call destination telephone number is obtained from the telephone numbers of the memory table and is included in the conference notification email, the call destination telephone number included in the conference notification email is displayed as a link which is selectable, when the link is selected, a change screen for changing the memory table of the server is displayed, and when a desired call destination telephone number is inputted to the displayed change screen, the telephone number of the memory table is changed.

15. A conference telephone line setting method according to claim 14, wherein the step of authenticating client terminals of participants of the conference comprises authenticating the client terminals when the client terminals receive email sent from the server and the participants log in an email server.

16. A conference telephone line setting method according to claim 14, wherein the step of authenticating client terminals of participants of the conference comprises authenticating the client terminals when a link generated for each of prospective participants is included in email sent from the server and the link is selected.

17. A conference system according to claim 1, wherein the memory table further includes email addresses and IP addresses of the participants, and the change screen is used to change the email address and the IP address at the same time of changing the telephone number.

18. A conference system according to claim 1, wherein when the memory table is changed and fixed, the server sends again the conference notification email to the client terminal in which the telephone number of the memory table is changed.

19. A conference system used to hold a conference on a communication network, comprising:

client terminals of participants of the conference, connected to the communication network;

telephone sets of the participants, connected to a telephone line;

a telephone line device connected to the telephone sets through the telephone line;

and a server connected to the communication network and capable of operating the telephone line device, wherein;

the server has a function of authenticating the client terminals of the participants of the conference; and the telephone line device has a function of setting a telephone line for the conference among the telephone sets of the participants, wherein;

a calling reservation function is added to a CTI (Computer Telephony Integration) program installed in the server, the server sends a conference notification email to the client terminals when a conference reservation is made, the conference notification email includes a call destination telephone number of the participant, and the server has a memory table which includes at least telephone numbers of the participants and information on calling time, and the call destination telephone number and information on calling time is changeable, the call destination telephone number is obtained from the telephone numbers of the memory table and is included in the conference notification email, the call destination telephone number included in the conference notification email is displayed as a link which is selectable, when the link is selected, a change screen for changing the memory table of the server is displayed, and when a desired call destination telephone number and information on calling time is inputted to the displayed change screen, the telephone number and information on calling time of the memory table is changed.

20. A conference system according to claim 19, wherein the server sends a conference notification email to the client terminals when a conference reservation is made, when a URL included in the conference notification email is selected prior to a conference start time, a change screen for changing the memory table is displayed, the displayed change screen has a calling reservation setting field, and the calling time of the memory table is changed by inputting a desired calling time in the calling reservation setting field.

* * * * *